United States Patent [19]

Gover

[11] 4,367,551
[45] Jan. 4, 1983

[54] ELECTROSTATIC FREE ELECTRON LASER

[75] Inventor: Avraham Gover, Tel Aviv, Israel

[73] Assignee: The United States of America as represented by the Secretary of the Air Force, Washington, D.C.

[21] Appl. No.: 169,056

[22] Filed: Jul. 15, 1980

[51] Int. Cl.$^3$ .............................................. H01S 3/09
[52] U.S. Cl. ...................................................... 372/2
[58] Field of Search ......................................... 372/2

[56] References Cited

PUBLICATIONS

"The Ubitron, A High-Power Traveling-Wave Tube Based on a Periodic Beam Interaction in Unloaded Waveguide", Phillips, R. M., *IRE Trans. on Elect. Devices*, Oct. 1960, pp. 231-241.
"Visible Light from Localized Surface Charges Moving Across a Grating", Smith et al., *Phys. Rev. 92, 1953, p. 1069.*
"Observation of Stimulated Emission of Radiation by Realistic Electrons in a Spatially Periodic Transverse Magnetic Field", Elias et al., *Phys. Rev. Lett.*, 36 (13), 1976, p. 717.
"First Operation of a Free-Electron Laser", Deacon et al., *Phys. Rev. Lett.*, vol. 38, No. 16, Apr. 1977, pp. 892-894.
"Amplification of Acceleration and Deacceleration of a Single Velocity Stream", Field et al., *Proc. of the IRE*, vol. 29, Feb. 1951, p. 194.
"Operation Regimes of Cerenkov-Smith-Purcell Free Electron Lasers and T. W. Amplifiers", byGover, *Optics Communications*, vol. 26, No. 3, Sep. 1978, pp. 375-379.
"Collective and Single Electron Interactions of Electron Beams with Electromagnetic Waves and Free Electrons Lasers, by Gover", *App. Phys.* 16 (1978), p. 121.
"One Body Analysis of Free Electron Lasers", Colson, *Phys. of Quant. Electrons*, vol. 5, 1978, p. 157.
"Stimulated Raman Scattering of an Intense Relativistic Electron Beam Subject to a Ripple Electric Field", Bekefi et al., *J. App. Phys.*, vol. 50, No. 8, Aug. 1979.
"A Unified Theory of Magnetic Bremsstrahlung, Electrostatic Bremsstrahlung, Compton-Raman Scatering and Cerenkov-Smith-Purcell Free Electron Laser.

*Primary Examiner*—William L. Sikes
*Assistant Examiner*—Leon Scott, Jr.
*Attorney, Agent, or Firm*—Donald J. Singer; Jacob N. Erlich

[57] ABSTRACT

An electrostatic free electron laser having an electromagnetic waveguide, means to produce a periodic longitudinal electrostatic field along the waveguide and an electron beam which passes through the waveguide. Radiative energy is generated by the laser as a result of the kinetic energy lost by the electron beam as it is decelerated during its interaction with the electromagnetic wave and the electrostatic field within the waveguide. In use as an oscillator, the electrostatic free electron laser includes a resonator either in addition to or instead of the waveguide.

17 Claims, 7 Drawing Figures

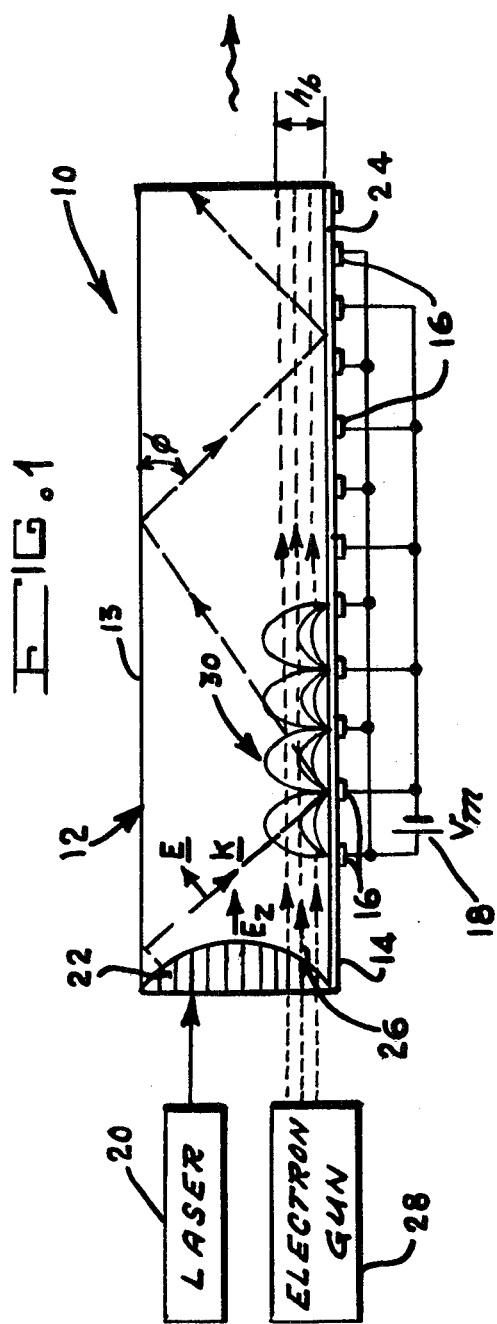
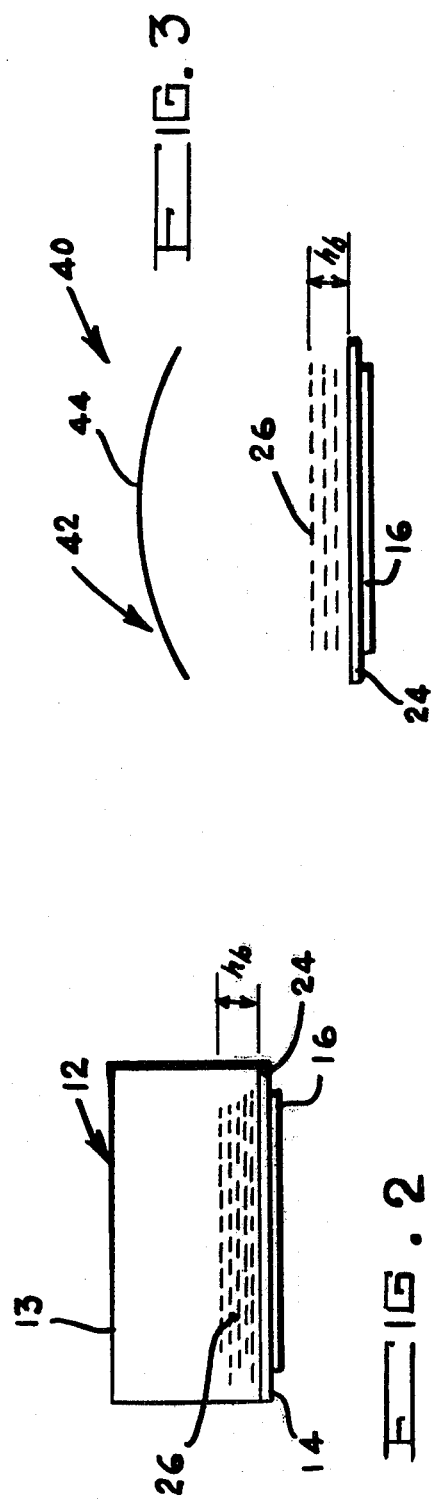

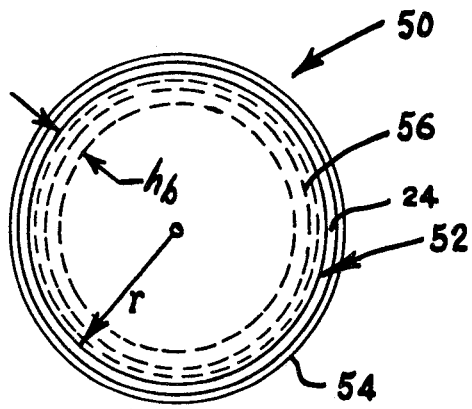
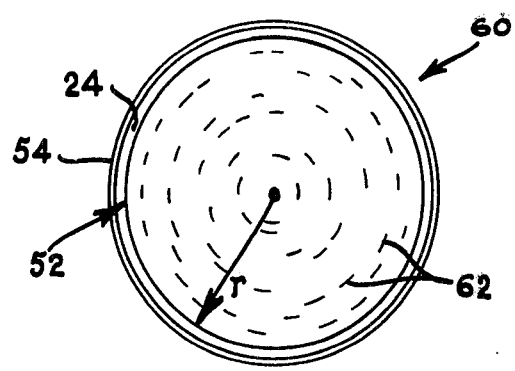
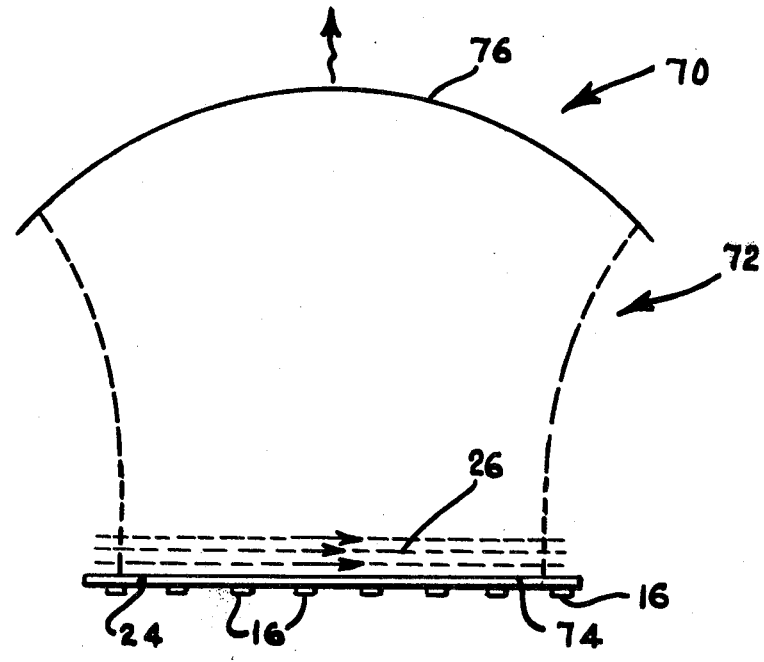
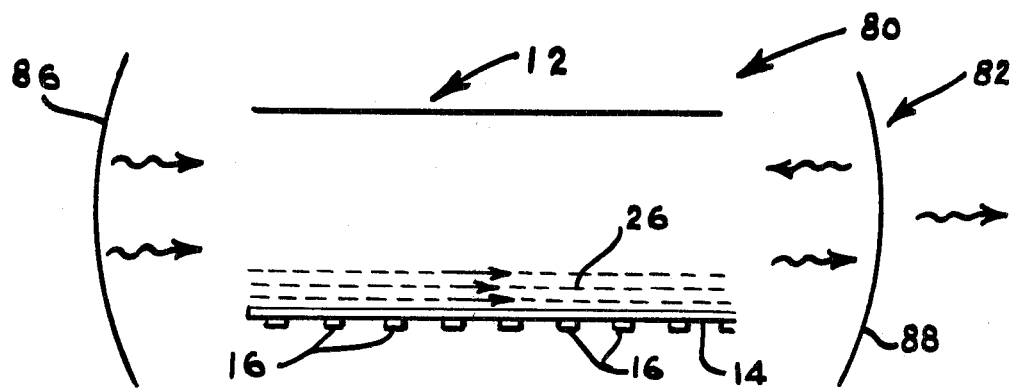

ELECTROSTATIC FREE ELECTRON LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to free electron lasers, and, more particularly, to an electrostatic free electron laser which is electronically tunable over a wide range of frequencies.

One example of a free electron laser is described in U.S. Pat. No. 3,822,410. This type of free electron laser operates on the principle of magnetic bremsstrahlung wherein a periodic magnetic field is utilized to produce radiation. Other types of free electron lasers, more commonly referred to as the Smith-Purcell and Cerenkov lasers are described in a publication by Gover et al entitled "Operation Regimes of Cerenkov-Smith-Purcell Free Electron Lasers and T. W. Amplifiers," *Optics Communications*, Vol. 26, No. 3, September, 1978, pp. 375–380. In these devices a slow electromagnetic wave structure, periodic waveguide (or grating) or a dielectric waveguide is used to facilitate the interaction of the electron beam and the electromagnetic wave.

However, even with these apparent different physical principles, both the magnetic bremsstrahlung and the Cerenkov-Smith-Purcell lasers have similar gain expressions, similar wave dispersion equations and similar operation regimes. The main difference between the magnetic bremsstrahlung and the Cerenkov-Smith-Purcell lasers is that the magnetic bremsstrahlung laser involves transverse modulation of the electron beam by the transverse periodic force, while the Cerenkov-Smith-Purcell lasers involve direct longitudinal modulation of the electron beam by the longitudinal component of the electric field of the electromagnetic wave. Nevertheless, the interaction between the electron beam and the electomagnetic wave is carried out through longitudinal modulation of the electron beam which is created by the ponderomotive force effect.

Since this is a second or third order effect in the fields, the interaction between the electromagnetic wave and the electron beam in the magnetic bremsstrahlung free electron laser is much weaker than the interaction in the Smith-Purcell-Cerenkov lasers (which are first order effects). Therefore, in principle, one of the differences between the magnetic bremsstrahlung free electron laser and the Smith-Purcell-Cerenkov lasers is that the latter devices can provide higher gain.

Another difference between magnetic bremsstrahlung laser and Smith-Purcell-Cerenkov lasers is in the interaction region width, which affects the power and efficiency of the device. In this aspect the difference is in favor of the magnetic bremsstrahlung free electron laser.

Unfortunately, both types of free electron lasers, as described hereinabove, contain drawbacks which affect both the efficiency and the overall reliability of their operation. In addition to the drawbacks presented above, the above-mentioned lasers also tend to be large and bulky as well as being difficult to tune. Consequently, there remains a void in the area of free electron lasers which needs to be filled.

SUMMARY OF THE INVENTION

The instant invention overcomes the problems set forth in detail by providing an electrostatic free electron laser which is compact, easily tunable and highly efficient in operation.

The electrostatic free electron laser of this invention overcomes some of the drawbacks of the magnetic bremsstrahlung as well as the Cerenkov-Smith-Purcell lasers. The electrostatic free electron laser defined in the present invention is capable of providing a wide interaction region and therefore operates at higher power levels than the Cerenkov-Smith-Purcell lasers. In addition, as the electron beam energy is lowered and the operation wavelength is lengthened, the electrostatic free electron laser of this invention increases its gain. Thus, the electrostatic free electron laser can be used advantageously at far infrared, millimeter or microwave frequencies, as well as operate in principle also at shorter wavelengths with high energy beams. An important advantage of electrostatic free electron laser of this invention over the magnetic free electron laser is that it can be produced with very short electrostatic periodicity and therefore be used with low energy beams thereby producing a smaller and more portable device.

Forming the basis for the operation of the free electron laser of this invention is the stimulated electrostatic bremsstrahlung effect produced by a periodic electrostatic field. When utilized as an amplifer this invention incorporates therein an electromagnetic waveguide, a periodic longitudinal electrostatic field along the waveguide and an electron beam which passes through the waveguide. In operation as an oscillator the present invention includes a resonator either in addition to or in place of the waveguide.

The radiative energy generated by the electrostatic free electron laser of this invention is the result of the reduction in the kinetic energy of the electron beam as it decelerates during the interaction between the electron beam, the electromagnetic wave and the electrostatic field. Interaction of the electron beam and the electromagnetic wave is a coherent stimulated process produced by the periodic electrostatic field at a certain synchronism condition given by the equation $$\beta_z + 2\pi/L = \omega/v_o$$

where $\beta_z$ is the longitudinal component of the wave number of the electromagnetic wave, L is the period of the periodic field, $\omega$ is the frequency of the electromagnetic wave and $v_o$ is the beam velocity. The synchronism condition depends on the beam velocity, wavelength and period of the periodic field. Thus the device is electronically tunable over a wide range of frequencies by changing the electron velocity. The wavelength operation regime is determined by the choice of electron beam velocity and periodicity. This may be obtained over a large range of wavelengths from the microwave to the ultraviolet.

It is therefore an object of this invention to provide a free electron laser which is based upon the stimulated electrostatic bremsstrahlung effect produced by a periodic electric field.

It is another object of this invention to provide an electrostatic free electron laser which provides high output.

It is still another object of this invention to provide an electrostatic free electron laser which is easily tunable.

It is a further object of this invention to provide an electrostatic free electron laser which is compact.

It is still a further object of this invention to provide an electrostatic free electron laser which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

FIG. 1 represents a side elevational, cross-sectional view, shown in schematic fashion, of the electrostatic free electron laser of this invention;

FIG. 2 represents a transverse, cross-sectional view, shown in schematic fashion, of the electrostatic free electron laser depicted in FIG. 1;

FIG. 3 represents a transverse, cross-sectional view, shown in schematic fashion, of another embodiment of the electrostatic free electron laser of this invention;

FIG. 4 represents a transverse, cross-sectional view, shown in schematic fashion, of another embodiment of the electrostatic free electron laser of this invention in which the electron beam is of an annular cross section;

FIG. 5 represents a transverse, cross-sectional view, shown in schematic fashion, of the electrostatic free electron laser depicted in FIG. 4 in which the annular cross-sectional electron beam is replaced with an electron beam having a solid cylindrical configuration;

FIG. 6 represents a side elevational, cross-sectional view, shown in schematic fashion, of the electrostatic free electron laser of this invention utilized as an oscillator; and FIG. 7 represents a side elevational, cross-sectional view, shown in schematic fashion, of the electrostatic free electron laser of this invention which incorporates a resonator in addition to the waveguide structure and being utilized as an oscillator.

DETAILED DESCRIPTION OF THE PREFERRED EMBODIMENTS

Reference is now made to FIG. 1 of the drawing which depicts schematically in a longitudinal cross-sectional view the electrostatic free electron laser 10 of this invention. In the embodiment depicted in FIG. 1 free electron laser 10 is utilized as an amplifier. The free electron laser 10 is made up of an electromagnetic waveguide 12 having a pair of longitudinally extending opposed walls 13 and 14. Juxtaposed or incorporated within one of the walls 14 are a plurality of transversely extending electrodes 16. Electrodes 16 are biased by any conventional DC voltage source 18 in order to produce a periodic electric field. Although FIGS. 1 and 2 of the drawing depict electrodes 16 as being located only along bottom wall 14, in some instances it may also be desirable to place these electrodes along top wall 13 as well as bottom wall 14 of waveguide 12.

Any suitable source of electromagnetic radiation such as laser 20 may be utilized with waveguide 12 in order to provide the electromagnetic wave 22 as illustrated in FIG. 1 of the drawing. In some instances it may be desirable to isolate electrodes 16 from the electromagnetic mode. This is accomplished by means of a reflective material 24 such as a multi-layer dielectric material which reflects the electromagnetic wave 22 so that losses in the electromagnetic mode can be reduced. However, it should be realized that this reflecting layer 24 may be omitted in some embodiments. In such a case the electromagentic wave 22 will be affected directly by the periodic structure.

Completing the electrostatic free electron laser 10 of this invention is an electron beam 26 produced by any suitable source such as electron gun 28. It is preferred that electron beam 26 pass as close as possible to electrodes 16. In addition, the optimal thickness of beam 26 should be given by the equation:

$$h_b = \beta_o \lambda / [4\pi(1 - \beta_o \cos \phi)]$$

where $h_b$ is the thickness of beam 26 (i.e., the interaction width), $\lambda$ is the wavelength of the radiation $\phi$ is the "zig-zag" angle of the electromagnetic mode in the waveguide and $\beta_o = v_o/c$ where $v_o$ is the electron beam velocity and c is the speed of light.

In addition, FIG. 1 shows the transverse spatial distribution (profile) 22 of the longitudinal component of the electric field in a particular example of a fundamental (zero order) TM electromagnetic mode. If waveguide 12 is a planar waveguide the mode can be described as planar waves which produce a "zig-zag" reflection motion of electromagnetic wave 22 between the waveguide walls 13 and 14. If $\phi$ is the zig-zag angle then $\beta_z$ of the equation $\beta_z + 2\pi/L = \omega/v_o$ is given by the equation $\beta_z = K \cos \phi = (2\pi/\lambda) \cos \phi$ where $\beta_z$ is the longitudinal component of the wave number of the electromagnetic wave, L is the period of the periodic field, $\omega$ is the frequency of the electromagnetic wave, $\lambda$ is the wavelength of the radiation and $v_o$ is the beam velocity.

The electrodes 16 which provide the periodic electric field can be produced with a very short (submicron) period by using photolithographic techniques. For example, in a planar structure interdigital electrodes 16 can be produced similarly to the fabrication of interdigital transducers for surface acoustic wave devices.

The cross sectional view shown in FIG. 2 of the drawing clearly illustrates the rectangular waveguide structure 12 of the electrostatic free electron laser 10 of this invention. Such a structure 12 can support electromagnetic modes with a large zig-zag angle in the plane of the wide walls, and a low angle in the plane of the short walls. Such modes have low losses and are capable of producing strong interaction.

The operation of the electrostatic free electron laser 10 of this invention is based on the stimulated electrostatic bremsstrahlung effect which is produced by the periodic electrostatic field. The radiative energy generated by the electrostatic free electron laser 10 of this invention is the result of the kinetic energy produced by the electron beam 26 as it is decelerated during its interaction with electromagnetic wave 22 and electrostatic field 30. Interaction of electron beam 26 and electromagnetic wave 22 is a coherent stimulated process produced by the periodic electrostatic field at a certain synchronism condition given by the equation $$\beta_z + 2\pi/L = \omega/v_o$$

where $\beta_z$ is the longitudinal component of the wave number of the electromagnetic wave 22, L is the period of the periodic field, $\omega$ is the frequency of the electromagnetic wave 22 and $v_o$ is the velocity of the electron beam 26. The above expression can also be written in terms of the operation wavelength $\lambda \simeq L \ (1/\beta_o - \cos \phi)$. The synchronism condition depends on the beam velocity, wavelength and period of the periodic field. As a result the free electron laser 10 of this invention is electronically tunable over a wide range of frequencies by changing the electron velocity. The wavelength operation regime is determined by the choice of the electron beam velocity and the periodicity.

Other embodiments of the electrostatic free electron laser 10 of this invention utilized as an amplifier are depicted in schematic fashion in FIGS. 3-5. In order to avoid obvious redundancies, FIGS. 3-5 will illustrate only those elements which are required in an understanding of the embodiments of this invention illustrated therein. Those elements found in FIGS. 3-5 identical to those found in FIGS. 1 and 2 will be given the same numerals. Only different elements will be designated differently.

More specifically, FIG. 3 illustrates, in a transverse cross-sectional view, an electrostatic free electron laser 40 in which the waveguide 42 is basically a planar waveguide. Since it is an open waveguide, at least one of the waveguide walls 44 will have a slightly curved configuration to provide lateral confinement of the waveguide mode. As with the free electron laser 10 depicted in FIGS. 1 and 2 of the drawing, electron beam 26 is the form of a sheet beam having a thickness $h_b$.

FIG. 4 illustrates a transverse cross-sectional view of an electrostatic free electron laser 50 of cylindrical symmetry. In this case the electrodes 54 (16) may be produced by a series of thin conductive rings deposited periodically along the cylindrical waveguide 52 and alternately biased with a potential difference between neighboring rings by a voltage source (not shown). The periodic electrodes 54 in the cylindrical structure may also be produced with two interlaced helices biased with a potential difference. The electron beam 56 has an annular cross-section which for best efficiency should have the thickness $h_b$.

FIG. 5 depicts in a transverse cross-sectional view an electrostatic free electron laser 60 which is similar to free electron laser 50 shown in FIG. 4 of the drawing but which contains therein an electron beam 62 of a solid cylindrical makeup. This device will be most efficient when radius r of cylindrical waveguide 52 is about equal to $h_b$.

FIGS. 6 and 7 of the drawing show schematically the electrostatic free electron lasers 70 and 80 which are utilized as oscillators. Since the basic elements which make up electrostatic free electron lasers 70 and 80 are identical to the elements making up laser 10 depicted in FIG. 1 of the drawing, the details of FIG. 1 are omitted from FIGS. 6 and 7. In addition, elements which are similar to the elements making up laser 10 will be given identical reference numerals.

Free electron laser 70 is represented in a cross-sectional longitudinal view. In FIG. 6 an open resonator structure 72 replaces the waveguide structure 12 shown in FIG. 1 of the drawing. This open resonator structure 72 comprises a flat mirror 74 and a curved mirror 76 spaced close enough to each other to satisfy resonator stability conditions. The generated radiation is bounced between mirrors 74 and 76 perpendicular to the direction of the electron beam 26. The generated radiation can be coupled out of resonator 12 through one of the mirrors 76. For example, mirror 76 may be partly transmissive by means of a slit therein (as is customary in millimeter and submilliter wavelengths lasers).

FIG. 7 of the drawing illustrates in a cross-sectional longitudinal view an electrostatic free electron laser 80 which incorporates a resonator 82 in addition to the waveguide structure 12. Resonator 82 is made with two curved mirrors 86 and 88, however, since it is a waveguide laser, even flat mirrors can be utilized to satisfy stability conditions. Furthermore, any other feedback producing resonator can be used in conjunction with any of the amplified structures (depicted in FIGS. 1-5) in order to produce an oscillator device.

Although this invention has been described with reference to particular embodiments, it will be understood to those skilled in the art that this invention is also capable of further and other embodiments within the spirit and scope of the appended claims. For example, a distributed feedback resonator may be used in the amplifier laser structures of FIGS. 1-5. This is done by producing a periodic perturbation on the electromagnetic waveguide with a period which is equal to half the wavelength of the electromagnetic mode in the waveguide or any intergral multiple of this value.

I claim:

1. An electrostatic free electron laser comprising: a housing, said housing extending in a longitudinal direction, means located adjacent one end of said housing for producing an electron beam and directing said electron beam through said housing in said longitudinal direction, means located adjacent said one end of said housing for producing an electromagnetic wave of radiation and directing said electromagnetic wave through said housing in said longitudinal direction, and means extending in a direction transverse to said longitudinal direction along at least a portion of said housing for producing a periodic longitudinal electrostatic field within said housing whereby energy generated by said free electron laser is the result of the kinetic energy lost by said electron beam as it is decelerated during its interaction with said electromagnetic wave and said electrostatic field within said housing.

2. An electrostatic free electron laser as defined in claim 1 wherein said means for producing said periodic electrostatic field comprises a plurality of electrodes extending transversely along at least a portion of said longitudinally extending housing.

3. An electrostatic free electron laser as defined in claim 1 wherein said housing is an electromagnetic waveguide.

4. An electrostatic free electron laser as defined in claim 3 wherein said means for producing said periodic electrostatic field comprises a plurality of electrodes extending transversely along at least a portion of said longitudinally extending housing.

5. An electrostatic free electron laser as defined in claim 3 wherein said electromagnetic waveguide is a planar waveguide.

6. An electrostatic free electron laser as defined in claim 5 wherein at least a portion of said electromagnetic waveguide has a slightly curved configuration.

7. An electrostatic free electron laser as defined in claim 3 further comprising a resonator.

8. An electrostatic free electron laser as defined in claim 7 wherein said resonator is comprised of a pair of curved reflectors, said curved reflectors being positioned transverse to the direction of said electron beam.

9. An electrostatic free electron laser as defined in claim 1 further comprising means located adjacent at least a portion of said longitudinally extending housing to isolate said electrostatic field producing means from said electromagnetic wave.

10. An electrostatic free electron laser as defined in claim 9 wherein said isolating means is made up of a reflective material.

11. An electrostatic free electron laser as defined in claim 1 wherein said electron beam has a predetermined thickness, said thickness being substantially equal to the term $\beta_o \lambda / [4\pi(1-\beta_o \cos \phi)]$, where $\lambda$ is the wavelength of said electromagnetic wave, $\phi$ is the electromagnetic mode "zig-zag" angle and $\beta_o = v_o/c$ where $v_o$ is the velocity of said electron beam and c is the speed of light.

12. An electrostatic free electron laser as defined in claim 1 wherein said interaction of said electron beam and said electromagnetic wave is a coherent stimulated process produced by said periodic electrostatic field at a certain synchronism condition given by the equation $\beta_z + 2\pi/L = \omega/v_o$ where $\beta_z$ is the longitudinal component of the wave number of said electromagnetic wave, L is the period of said periodic electrostatic field, $\omega$ is the frequency of said electromagnetic wave and $v_o$ is the velocity of said electron beam.

13. An electrostatic free electron laser as defined in claim 1 wherein said housing is formed of a cylindrical configuration.

14. An electrostatic free electron laser as defined in claim 13 wherein said periodic electrostatic field producing means comprises a plurality of transversely circumscribing electrodes having a ring-like configuration.

15. An electrostatic free electron laser as defined in claim 1 wherein said electron beam is of an annular cross-section.

16. An electrostatic free electron laser as defined in claim 1 wherein said housing is in the form of an open resonator.

17. An electrostatic free electron laser as defined in claim 16 wherein said resonator comprises a flat reflector and a curved reflector, said flat reflector and said curved reflector being positioned in opposed relationship to each other and both said reflectors lying substantially in planes along said longitudinal direction of said housing whereby said energy generated by said free electron laser is reflected off said reflectors in a direction transverse to the direction of said electron beam before being output through one of said reflectors.

* * * * *